United States Patent
Proctor et al.

(10) Patent No.: US 12,175,845 B2
(45) Date of Patent: Dec. 24, 2024

(54) GENERATION OF FOLLOW-UP ACTION BASED ON INFORMATION SECURITY RISKS

(71) Applicant: MOTOROLA SOLUTIONS, INC., Chicago, IL (US)

(72) Inventors: Lee M. Proctor, Chicago, IL (US); Trent J. Miller, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 32 days.

(21) Appl. No.: 17/726,283

(22) Filed: Apr. 21, 2022

(65) Prior Publication Data

US 2023/0343193 A1    Oct. 26, 2023

(51) Int. Cl.
G08B 13/196 (2006.01)
G06V 20/52 (2022.01)
G08B 25/01 (2006.01)

(52) U.S. Cl.
CPC ....... G08B 13/19613 (2013.01); G06V 20/52 (2022.01); G08B 25/016 (2013.01)

(58) Field of Classification Search
None
See application file for complete search history.

(56) References Cited

U.S. PATENT DOCUMENTS

| | | | |
|---|---|---|---|
| 8,345,935 B2 * | 1/2013 | Angell | G06V 20/52 382/117 |
| 8,896,446 B2 | 11/2014 | Cusack, Jr. | |
| 10,692,364 B1 * | 6/2020 | Rao | G06V 20/41 |
| 10,741,044 B1 * | 8/2020 | Heintzelman | H04W 4/33 |
| 10,769,908 B1 * | 9/2020 | Burris | G06V 40/10 |
| 10,867,460 B1 | 12/2020 | Miller et al. | |
| 10,885,755 B2 * | 1/2021 | Monge Nunez | G08B 25/14 |
| 11,745,870 B1 * | 9/2023 | Nevdahs | B64U 10/13 244/17.13 |
| 2004/0201470 A1 * | 10/2004 | Reed | G08B 7/062 340/506 |
| 2006/0288411 A1 * | 12/2006 | Garg | H04L 63/0263 726/22 |
| 2009/0232357 A1 * | 9/2009 | Angell | G06V 20/52 382/103 |
| 2011/0050876 A1 * | 3/2011 | Nagata | G08B 13/19613 382/218 |
| 2013/0039497 A1 * | 2/2013 | Ramalho | G08B 13/1672 381/56 |
| 2014/0320282 A1 * | 10/2014 | Zhang | G08B 7/066 340/502 |

(Continued)

*Primary Examiner* — Ricky Chin
(74) *Attorney, Agent, or Firm* — PERRY + CURRIER INC.

(57) ABSTRACT

In response to detecting an incident at a building, a risk assessment for the building is performed. The risk assessment identifies dynamic security constraints for different locations at the building. A set of behavioral rules for controlling a sensor system at the building is updated based on the risk assessment to obtain an updated set of behavioral rules. The sensor system operating under the updated set of behavioral rules is referenced to detect a visitor at a location of the building during the incident. The location of the visitor is correlated to the risk assessment to determine a specific information security risk posed by the visitor. A recommended follow-up action is generated based on the specific information security risk.

20 Claims, 10 Drawing Sheets

(56) References Cited

U.S. PATENT DOCUMENTS

| | | | |
|---|---|---|---|
| 2015/0281287 A1 | 10/2015 | Gill et al. | |
| 2015/0287326 A1* | 10/2015 | Weller | B60R 25/102 |
| | | | 348/148 |
| 2016/0308859 A1 | 10/2016 | Barry et al. | |
| 2019/0332871 A1* | 10/2019 | Sudarsan | G08B 13/19686 |
| 2020/0312121 A1* | 10/2020 | Shiner | G08B 26/008 |
| 2021/0302167 A1* | 9/2021 | Crolley | G01S 19/45 |
| 2021/0374405 A1* | 12/2021 | Salguero | G06V 20/10 |
| 2022/0004949 A1* | 1/2022 | Goncharov | G06V 20/52 |
| 2022/0157139 A1* | 5/2022 | Subramany | G08B 13/19613 |
| 2022/0391796 A1* | 12/2022 | O'Herlihy | G06V 10/764 |
| 2022/0399105 A1* | 12/2022 | Wagner Block | G16H 40/20 |
| 2023/0070772 A1* | 3/2023 | Bingham | G08B 19/005 |

\* cited by examiner

GENERATION OF FOLLOW-UP ACTION BASED ON INFORMATION SECURITY RISKS

BACKGROUND

Secure locations are often found in corporate, military, and research and development facilities. A given building may have secure areas and non-secure areas. Some buildings may be entirely secure. Further, different levels of security may apply. Facilities typically have security protocols for employees and visitors. For example, certain locations in building may be off limits to certain employees or visitors, while other locations may be relatively unsecure and allow the public to visit.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
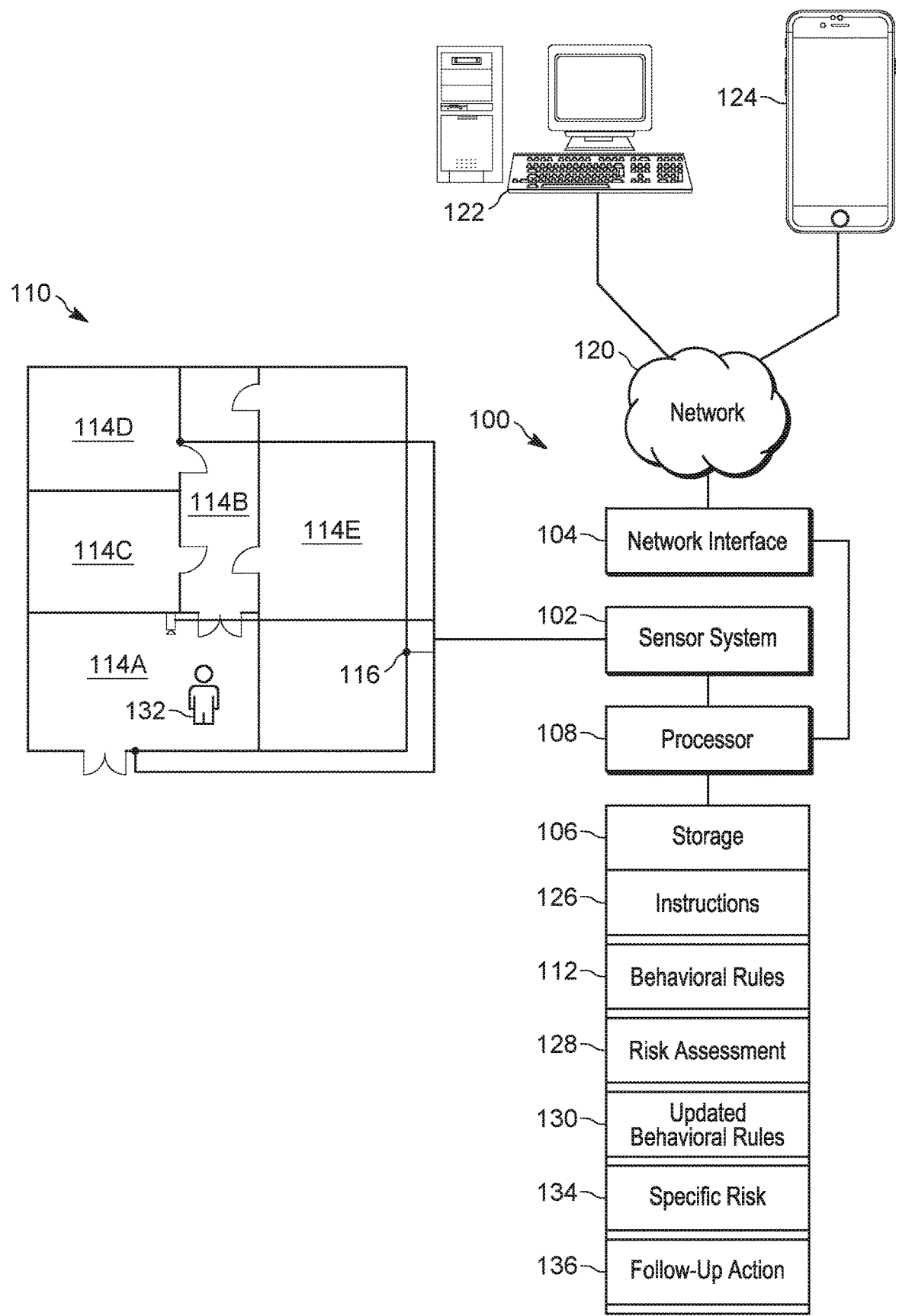
FIG. 1 is a block diagram of a system to generate a follow-up action based on detection of a visitor to a building during an incident, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Unexpected visitors to a building may require temporary access to secure locations in the building. For example, first responders, such as police, firefighters, and emergency medical personnel, may be called to respond to an emergency at a building and may, as part of their job, access areas where visitors are not normally allowed. While access by first responders should not be hindered in any way, first responders may encounter information, objects, people, etc. during their visit that may violate normal security protocols. For example, a firefighter responding to a call may visit a room that contains a secret prototype. A paramedic responding to a medical emergency in a room may see sensitive information displayed on a monitor. A police officer entering a secure area may see people attending a secure meeting. Numerous other examples are contemplated and should be readily apparent to the person of ordinary skill in the art in light of this disclosure. In short, emergencies, which must be attended, create the side-effect problem of allowing unauthorized visitors into secure locations.

The techniques disclosed herein automatically perform a risk assessment for a building undergoing an incident, update a set of behavioral rules for controlling a sensor system at the building based on the risk assessment, and reference the sensor system, the updated behavioral rules, and a location of a visitor during the incident to generate a recommended follow-up action based on a specific information security risk posed by the visitor. The follow-up action may be for the benefit of the organization that controls the building, the visitor, the visitor's organization, or any combination of such. A follow-up action may include recommending the visitor sign a non-disclosure agreement (NDA), attend a debrief interview, submit media captured during the visit (e.g., first responder bodycam recordings), seek medical care, and so on. A follow-up action may include recommending the organization that operates the building take steps to mitigate the effects of a possible leak of confidential information. As such, a necessary but unauthorized visit can be made to comply with a security protocol, or comply as closely as possible, after the fact.

In accordance with an example embodiment, a non-transitory computer-readable medium includes instructions that, when executed by a processor, cause the processor to, in response to detecting an incident at a building, perform a risk assessment for the building, where the risk assessment identifies dynamic security constraints for different locations at the building. The instructions further cause the processor to update a set of behavioral rules for controlling a sensor system at the building based on the risk assessment to obtain an updated set of behavioral rules, reference the sensor system operating under the updated set of behavioral rules to detect a visitor at a location of the building during the incident, correlate the location of the visitor to the risk assessment to determine a specific information security risk posed by the visitor, and generate a recommended follow-up action based on the specific information security risk.

In accordance with another example embodiment, a system includes a sensor system located at a building, storage to store a risk assessment of the building and a set of behavioral rules for controlling the sensor system, and a processor connected to the sensor system and the storage. The processor is configured to, in response to detecting an incident at the building, perform the risk assessment for the building. The risk assessment identifies dynamic security constraints for different locations at the building. The processor is further configured to update the set of behavioral rules for the sensor system based on the risk assessment to obtain an updated set of behavioral rules, reference the sensor system operating under the updated set of behavioral rules to detect a visitor at a location of the building during the incident, correlate the location of the visitor to the risk assessment to determine a specific information security risk posed by the visitor, and generate a recommended follow-up action based on the specific information security risk.

In accordance with another example embodiment, a method includes, in response to detecting an incident at a building, performing a risk assessment for the building, where the risk assessment identifies dynamic security constraints for different locations at the building. The method further includes updating a set of behavioral rules for controlling a sensor system at the building based on the risk assessment to obtain an updated set of behavioral rules, referencing the sensor system operating under the updated set of behavioral rules to detect a visitor at a location of the building during the incident, correlating the location of the visitor to the risk assessment to determine a specific information security risk posed by the visitor, and generating a recommended follow-up action based on the specific information security risk.

The above-mentioned embodiments will be discussed in more detail below, starting with example system and device architectures of the system in which the embodiments may be practiced, followed by an illustration of processing blocks for achieving an improved technical method, device, and system for generation of follow-up action based on information security risks.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

With reference to FIG. 1, an example system 100 includes a sensor system 102, a network interface 104, storage 106, and a processor 108 connected to the sensor system 102, the network interface 104, and the storage 106.

The sensor system 102 is located at a building 110 to which access is monitored according to a set of behavioral rules 112 that control the sensor system 102. The sensor system 102 may include any suitable number, type, and positioning of sensors 116 to monitor access to any number of locations 114A-114E of the building 110. The term "location" is used herein to denote a defined location within a building and may denote various rooms or areas with different architectural or functional features, such as a foyer, a mezzanine, a lobby, an office, a meeting room, a yard, a laboratory, a shop floor, a plant, a hallway, an atrium, a boardroom, a hanger, a firing range, a test range, etc.

The sensor system 102 may sense basic information, such as presence/absence of movement, a door being open or closed, a proximity of a portable wireless device (e.g., via near-field technology), etc. The sensor system 102 may sense complex information, such as by capturing imagery or sound and processing such to identify physical or biometric features. Example sensors that may be part of the sensor system 102 include a motion sensor, a proximity sensor, a door sensor, an antenna (e.g., a radio frequency identification or RFID antenna), a camera, a microphone, and similar. A sensor may provide sufficient data to identify a person or group to which the person belongs. For example, a camera may capture images sufficient to perform facial recognition to identify an individual or feature recognition to identify a group, such as a first responder, for example, by detecting a uniform, insignia, badge, equipment, headgear, etc.

The network interface 104 is connectable to a computer network 120. The network interface 104 may include hardware, such as a network adaptor, and software/firmware, such as a driver. The computer network 120 may include a local-area network (LAN), a wide-area network (WAN), a virtual private network (VPN), a mobile network, the internet, or combination of such. The computer network 120 may be wired, wireless, or both. The network interface 104 allows the system 100 to communicate with other network-capable computing devices 122, 124, such a computer or smartphone, which may be operated by an organization in control of the building 110, an employee of such organization, a visitor to the building 110, an organization to which the visitor belongs, or another entity.

The storage 106 may include an electronic, magnetic, optical, or other type of non-volatile physical storage device that encodes instructions 126 that implement the functionality discussed herein. Examples of storage 106 include a non-transitory computer-readable medium such as a hard drive (HD), solid-state drive (SSD), read-only memory (ROM), electrically-erasable programmable read-only memory (EEPROM), or flash memory.

The storage 106 may store a risk assessment 128 of the building 110 and a set of behavioral rules 112 for controlling the sensor system 102.

The behavioral rules 112 control the sensor system 102 to capture and interpret information and may turn on/off a sensor, start/stop recording of video/audio, increase/decrease resolution of a recording, raise an alert, sound an alarm, unlock/lock a door, etc. The behavioral rules 112 may govern what type of information is sensed and what analysis is performed, if any. For example, a behavioral rule 112 may record video at a location when movement is detected at the location. In another example, a behavioral rule 112 may sound an alarm when movement is detected at a location. In still another example, a behavioral rule 112 may cause feature recognition or biometric analysis, such as facial recognition, to be performed on people detected at a location and classify or identify the people at the location. Numerous other examples of behavioral rules 112 are contemplated and should be readily apparent in light of this disclosure. The behavioral rules 112, in general, control the activity, fidelity, and/or analysis performed with the sensor system 102.

A normal set of behavioral rules 112 may be in force during normal, non-emergency operation of the building 110. Any number of sets of behavioral rules 112 may be used for various circumstances, including multiple different sets of behavioral rules 112 for normal operations under different circumstances. For example, when a VIP is present at the building 110, a different set of behavioral rules 112 may be used compared to when the VIP is absent.

The risk assessment 128 identifies dynamic security constraints for different locations 114A-114E at the building 110. Dynamic security constraints include the temporary presence or absence of people, objects, or information that may raise a security concern. Examples of dynamic security constraints at particular locations 114A-114E at the building 110 include a meeting, the presence of an object, the presence of a person, displayed information, and audible information. For example, a meeting may involve the sharing of sensitive information, which may be displayed at the meeting. An object may be sensitive in nature, such as a prototype, trade secret, newly developed material, lab sample, or research subject. The presence of a person may be sensitive information, such as a VIP who is only present at the building under certain circumstances. Displayed information may include information on monitors, televisions, screens, whiteboards, flipcharts, calendars, and other visual media. Audible information may include playback of sound, voice, alerts, and alarms outputted by speakers, monitors, televisions, screens, intercoms, telephones, and so on. Numerous other examples of dynamic security constraints are contemplated and should be readily apparent to a person of ordinary skill in light of this disclosure.

The processor 108 cooperates with the storage 106 and may also cooperate with another non-transitory machine-readable medium that includes a volatile memory, such as a random-access memory (RAM), to execute the instructions 126.

The instructions 126 may be directly executed, such as binary or machine code, and/or may include interpretable code, bytecode, source code, or similar instructions that may undergo additional processing to be executed. All of such examples may be considered executable instructions.

The processor 108 executes the instructions 126 to detect an incident at the building and, in response, performs the risk assessment 128 for the building 110 to identify dynamic security constraints for different locations 114A-114E at the building 110. The incident may be an emergency, such as a fire, severe weather event, injury, crime, terrorist attack, or similar incident to which first responders attend.

The risk assessment 128 may reference information captured by the sensor system 102, such as the detection of people and objects at locations 114A-114E of the building 110, as well as other information, such as an electronic schedule data (e.g., meeting information), media playback data (e.g., screen content), project data, and so on. Execution of the risk assessment 128 will be discussed in further detail below.

The processor 108 updates the set of behavioral rules 112 for the sensor system 102 based on the risk assessment 128 to obtain an updated set of behavioral rules 130. The updated behavioral rules 130 are adapted to the risk assessment 128 and thus the incident, in contrast to the normal behavioral rules 112, which are configured for normal operations of the building 110. The updated behavioral rules 130 may be specifically adapted to the type of incident (e.g., fire, severe weather event, etc.). The updated behavioral rules 130 change the behavior of the sensor system 102 in capturing and/or processing sensor data relevant to the change of operations at the building during the incident. For example, the normal behavioral rules 112 may not perform facial recognition, while the updated behavioral rules 130 may perform facial recognition, so as to distinguish visitors related to the incident, such as first responders, from people normally allowed to be present at the building 110.

The processor 108 references the sensor system 102, as operating under the updated set of behavioral rules 130, to detect a visitor 132 at a location 114A of the building 110 during the incident. The processor 108 may further classify the visitor 132. For example, in the case of an emergency incident, the processor 108 may classify visitors detected at the building 110 as first responders and not first responders. As such the processor 108 may classify the visitor 132 as a first responder who is responding to the detected emergency incident. Note that when the updated set of behavioral rules 130 is active, the behavioral rules 112 may be considered the previous set of behavioral rules.

Examples of visitors 132 have been given above. While most visitors are contemplated to be human, it is also contemplated that autonomous or semi-autonomous machines such as drones may be considered visitors within the scope of this disclosure. First responders may employ drones or similar technologies to assist in emergencies and such devices may inadvertently capture sensitive information, for example, by way of video recording. As such, a visitor may be human or an autonomous or semi-autonomous machine.

The processor 108 correlates the location 114A of the visitor 132 to the risk assessment 128 to determine a specific information security risk posed by the visitor 132. That is, the location 114A of the visitor 132 is compared to location-specific information sensitivity defined by the risk assessment 128 to determine whether the visitor 132 may have come into contact with sensitive information. If it is determined that the visitor 132 could have viewed, heard, or otherwise witnessed sensitive information, then a specific information security risk 134 may be considered to exist.

The processor 108 generates a recommended follow-up action 136 based on the specific information security risk 134 determined from the presence of the visitor 132 at the location 114A. The follow-up action 136 may be transmitted to a computing device 122 operated by the organization in control of the building 110, so that the organization may take internal action on the presumption that sensitive information was witnessed and/or follow up with the visitor 132 or the visitor's organization to have the visitor 132 sign an NDA, attend a debrief interview, or take other action in view of the chance that the visitor 132 witnessed sensitive information during their visit to the location 114A. In the example of a first responder, the recommended follow-up action 136 may be specific to the first responder organization to which the first responder belongs. For example, a police organization may be requested to submit bodycam video obtained during the visit by a police officer, while another classification of first responder may not be requested to provide such.

When the incident ends, the processor 108 may revert to the previous set of behavioral rules 112 to operate the sensor system 102 normally.

Accordingly, the system 100 provides automated response to possible or actual inadvertent disclosure of sensitive information to visitors 132 of a building 110, particularly first responders responding to an emergency incident at the building. The response includes automated generation of a follow-up action 136 to reduce or eliminate the consequences of the disclosure of sensitive information.

Figure 2:
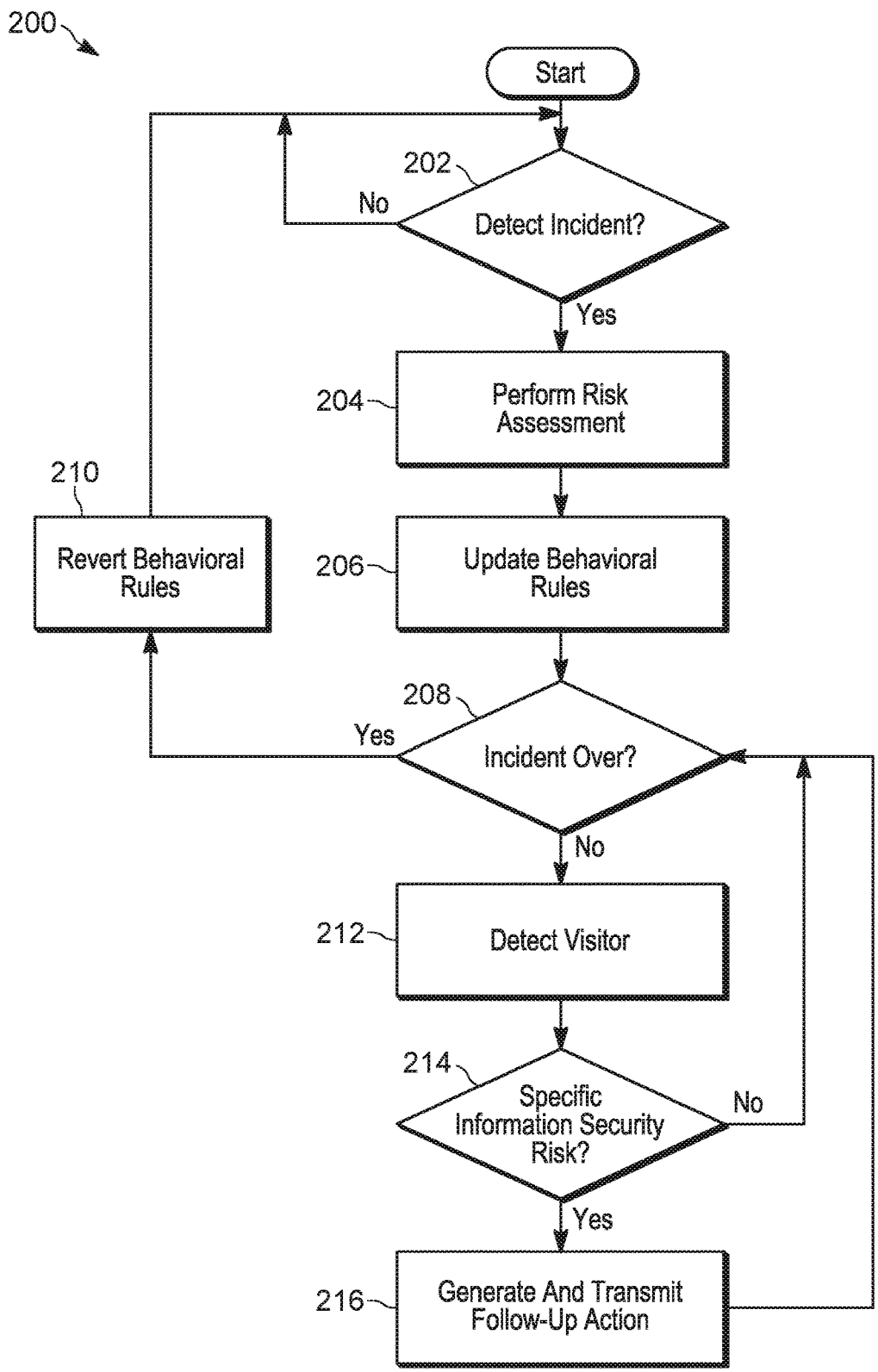
FIG. 2 is a flowchart of a method of generating a follow-up action based on detection of a visitor to a building during an incident, according to embodiments of the present disclosure.

FIG. 2 shows a method 200 of generating a follow-up action based on detection of a visitor to a building during an incident. The method 200 incorporates techniques discussed above with respect to the system 100 of FIG. 1. The method 200 may be implemented with the system 100, such as by processor-executable instructions 126. Although the method 200 is not limited to a particular system, FIG. 1 and related description may be referenced for further discussion that is not repeated here for sake of brevity, with like terminology and reference numerals denoting like components.

At block 202, an incident may be detected at a building. The incident may be an emergency incident that requires first responders to attend. The method 200 may operate continually to detect such incidents, via block 202.

At block 204, in response to detecting the incident at the building, a risk assessment for the building is performed. The risk assessment identifies dynamic security constraints for different locations at the building. Dynamic security constraints may include people, objects, or information that may raise an information security concern given that a visitor will be attending the building due to the incident and that the visitor will not be governed by normal security protocols.

At block 206, behavioral rules for controlling a sensor system at the building are updated based on the risk assessment. An updated set of behavioral rules is used to control the sensor system during the incident. The updated behavioral rules are adapted to capture or interpret sensor data specific to visitors, such as first responders, expected to visit the building because of the incident.

If, at block 208, the incident ends, then the sensor system reverts to the previous set of behavioral rules, at block 210, for normal operation of the building. The method 200 may repeat from the start to detect a subsequent incident.

At block 212, the sensor system operating under the updated set of behavioral rules detects visitors to locations of the building during the incident. A visitor may be a first responder attending an emergency that is occurring at the building. The sensor system may detect a person and identify them as a first responder. A group or individual identity of the visitor may be determined. Group identity may be determined by detection of insignia, uniform, equipment, or other characterizing feature of a first responder. Individual identity may be determined by facial recognition, recognition of a badge/helmet number, or similar uniquely identifying information.

At block 214, a specific information security risk posed by the visitor is determined by correlating the location of the visitor to the risk assessment generated at block 204. The location of the visitor is compared to locations identified in the risk assessment to determine whether the visitor is present at a location during a time that the location has sensitive information. If the visitor is present at such a location, then specific information security risk is considered to exist. If no such specific information security risk results from the visitor being at the location, no action may be taken, and the method 200 may continue to detect visitors to the building, via block 212, until the incident is over, via block 208.

At block 216, when a specific information security risk exists due to a visitor, a recommended follow-up action is generated based on the specific information security risk. The follow-up action may be specific to the visitor, the group to which the visitor belongs (e.g., firefighter, police, etc.), and/or the nature of the sensitive information identified by the risk assessment. The follow-up action may be transmitted to a computing device operated by an organization that controls the building and/or may be transmitted to a computing device operated by the visitor or the visitor's organization. Follow-up actions may be communicated during the incident or may be accumulated during the incident and communicated after the incident ends.

The method 200 may then repeat, so as to operate on subsequent incidents. The method 200 may be performed continually.

Figure 3:
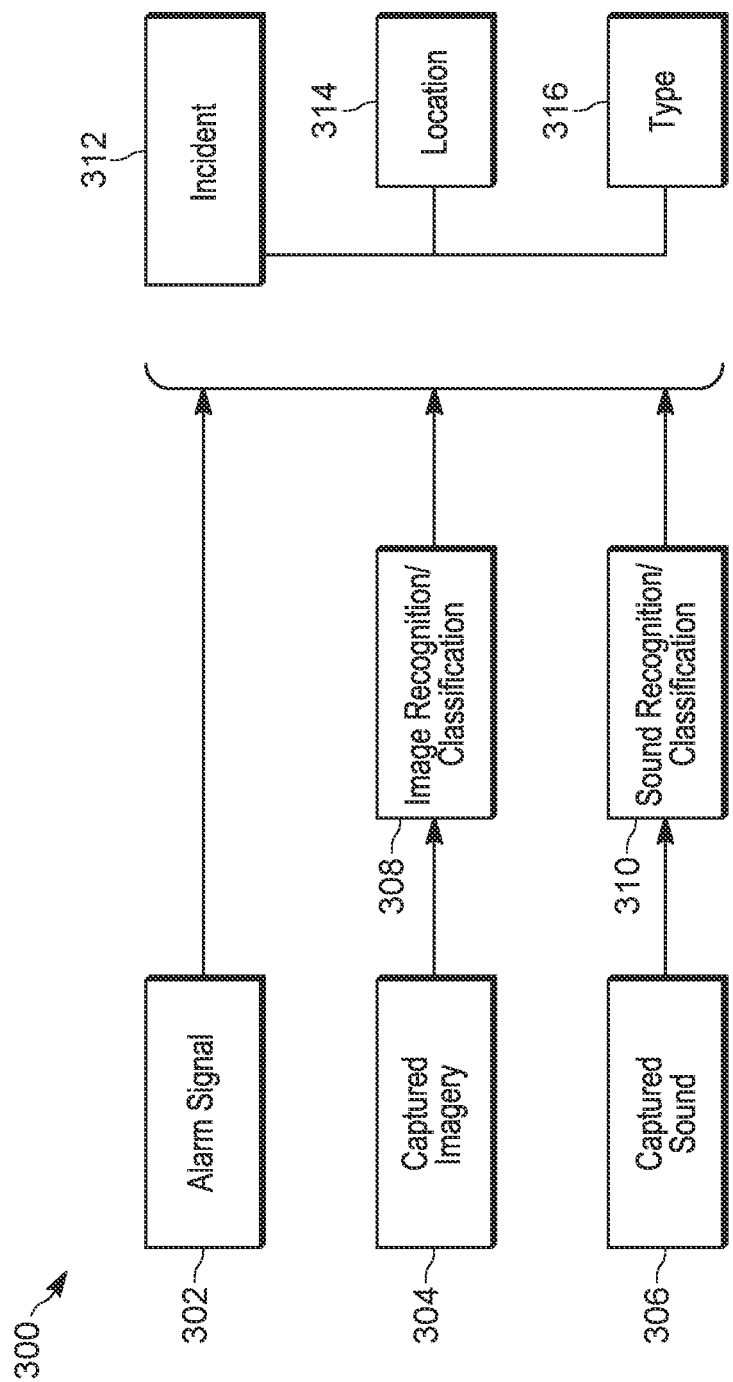
FIG. 3 is a schematic diagram of incident detection, according to embodiments of the present disclosure.

FIG. 3 shows process and data related to incident detection 300 at a building 110, as discussed above with regard to FIGS. 1 and 2 and specifically, block 202 of FIG. 2.

Incident detection 300 may be performed based on various inputs, such as an alarm signal 302, captured imagery 304, and captured sound 306. Any one or combination of these inputs 302-306 may be used to detect an incident.

An alarm signal 302 may be a special purpose alarm signal generated by a device or sensor specifically adapted to detect incidents. Examples of such include a fire alarm, a smoke detector, an emergency call button, a telephone configured to detect a call to an emergency telephone number (e.g., 911), and similar. An alarm signal 302 may be taken as a direct and unambiguous indication of an incident. An alarm signal 302 may be generated by a sensor of the sensor system 102 of FIG. 1.

Captured imagery 304 may be captured by a camera or other imaging device and processed using image recognition/classification 308. A camera or other imaging device may be part of the sensor system 102 of FIG. 1. Image recognition/classification 308 may be configured to detect features or objects that indicate the occurrence of an incident. A trained machine-learning model, such as a neural network, may be used for image recognition/classification 308. Image recognition/classification 308 may output a list of possible incidents with confidence levels, which can be converted to an unambiguous indication of an incident by application of a confidence level threshold.

Similarly, captured sound 306 may be captured by a microphone and processed using sound recognition/classification 310. A microphone may be part of the sensor system 102 of FIG. 1. Sound recognition/classification 310 may be configured to detect audio features that indicate the occurrence of an incident. A trained machine-learning model, such as a neural network, may be used for sound recognition/ classification 310. Sound recognition/classification 310 may output a list of possible incidents with confidence levels, which can be converted to an unambiguous indication of an incident by application of a confidence level threshold.

Any one or combination of inputs 302-306 may be used to generate an indication of an incident 312 at a building. An input 302-306 may be tied to a location. That is, a sensor that originates the input 302-306 may be limited to a specific location. For example, smoke detectors may be installed in each room of a building and each smoke detector may generate an alarm signal specific to its location. As such, an incident 312 may include a location 314, which may be useful for performing risk assessments for large buildings. For example, a risk assessment and subsequent visitor detection and follow-up action may be limited to a portion of a building. Location 314 may also be useful to increase the efficiency of an update to behavioral rules that control a sensor system. For example, it may not be necessary to update behavioral rules at locations far away from the location of the incident 312.

An input 302-306 may be tied to a type of incident 312. That is, a sensor that originates the input 302-306 may be limited to detecting a specific type of incident. For example, a smoke detector is typically limited to detecting smoke. As such, an incident 312 may include a type 316, which may be useful for visitor detection. Visitor detection may be limited to visitors consistent with the type of incident. For example, if the incident 312 is a fire, then visitor detection may focus on fire fighters and paramedics, as opposed to police.

Figure 4:
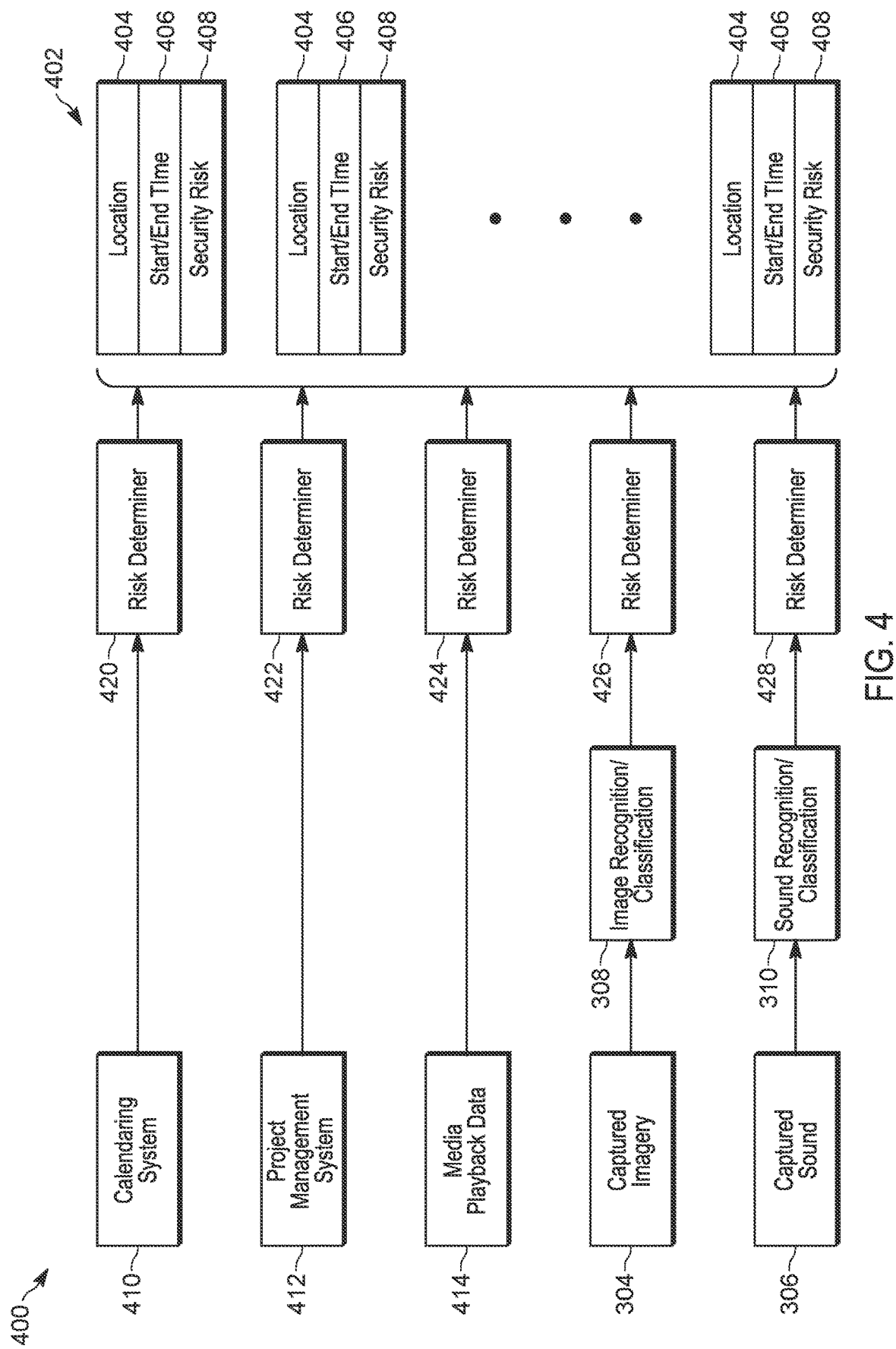
FIG. 4 is a schematic diagram of a risk assessment, according to embodiments of the present disclosure.

FIG. 4 shows process and data related to risk assessment 400 at a building 110, as discussed above with regard to FIGS. 1 and 2 and specifically, the risk assessment 128 of FIG. 1 and block 204 of FIG. 2. The risk assessment 400 identifies dynamic security constraints 402 for locations at the building 110.

A dynamic security constraint 402 may specify a location 404, start and/or end time 406, and a security risk 408. The location 404 is a location at the building 110, such as defined locations 114A-114E (FIG. 1). The start and/or end time 406 specifies when the risk 408 is in effect. The risk 408 may express a security level, the nature of sensitive information present at the location, and similar. Example security levels include high security, low security, secret, and highly confidential. Specific degrees of risk 408 may be defined based on specific implementation requirements. The nature of the sensitive information may be determined from sources of data 410-414, 304, 306 referenced to generate dynamic security constraints 402.

The dynamic security constraints 402 may be generated with reference to data sources, such as a calendaring system 410, a project management system 412, media playback data 414, captured imagery 304, and captured sound 306. Captured imagery 304 and captured sound 306 and respective recognition/classification 308, 310 are discussed above.

A calendaring system 410 may include a program, such as Microsoft Outlook™ that associates people with locations, such as meeting rooms, as well as other resources, in the form of calendar events. Location 404 and start/end time 406 may be directly mapped from a calendar event to a dynamic security constraint 402. The calendar event may be processed by a risk determiner 420 to obtain risks 408 for the dynamic security constraints 402. The risk determiner 420 may map information from a calendar event to a risk 408. The risk determiner 420 may associate people who may attend calendar events with different security risks 408. For example, the job title "Engineer" may be mapped to a high security risk 408, whereas the job title "Administrator" may be mapped to a low security risk 408. The risk determiner 420 may associate rooms selectable for calendar events with different security risks 408. For example, certain rooms may be frequently used to discuss confidential information and such rooms may be defined by the risk determiner 420 to have specific risks 408. The risk determiner 420 may associate text, such as calendar event subject lines, titles, descriptions, and attached documents with different security risks 408. The risk determiner 420 may be programmed to use keywords or a machine-learning model to associate freeform text with security risks 408. Other resources, such as projectors, computer equipment, etc., associated with calendar events may be associated by the risk determiner 420 to different security risks 408.

A project management system 412, such as OpenProject™, may associate people and physical resources with project stages and locations within a building. Location 404 and start/end time 406 may be directly mapped from a project to a dynamic security constraint 402. The project may be processed by a risk determiner 422 to obtain risks 408 for the dynamic security constraints 402. Similar to calendar events, individuals, job titles, descriptive text, rooms, and resources may be mapped by the risk determiner 422 to security risks 408. The risk determiner 422 may associate computer-aided design (CAD) models, physical prototypes, testbeds, raw or processed materials, shipping information, manufacturing facilities, and other project related data to security risks 408.

Media playback data 414 may indicate scheduled or actual playback information of audio, video, and image media. Such information may include a description of the media, time of playback, location of playback, and similar. Location 404 and start/end time 406 may be directly mapped from a media playback data 414 to dynamic security constraints 402. Media playback data 414 may be processed by a risk determiner 424 to obtain risks 408 for the dynamic security constraints 402. The risk determiner 424 may use keywords or a machine-learning model to process descriptive text concerning media being played. Examples of such media include, slideshows, audio recordings, and videos, which may be played for informational or training purposes. For example, a breakroom may have a monitor that displays a slideshow with safe operating instructions for a high-security piece of machinery.

A sensor system 102 may capture imagery 304 and sound 306, which may be processed by recognition/classification 308, 310. Output of recognition/classification 308, 310 may be provided to a respective risk determiner 426, 428. The risk determiner 426, 428 may map features extracted from the captured media to security risks 408 of dynamic security constraints 402. Location 404 and start/end time 406 of dynamic security constraints 402 may be directly obtained from metadata related to the capture imagery 304 and sound 306. Examples of sensitive information that may be captured as imagery 304 or sound 306 include whiteboards, flipcharts, people, objects, broadcasts, and so on. A risk determiner 426, 428 may classify the existence of features as sensitive information regardless of whether those features may be decodable by the risk determiner 426, 428. For example, a blank whiteboard may be classified as non-sensitive, while a whiteboard with any markings at all may be classified as sensitive.

In various examples, image recognition/classification 308 and risk determiner 426 may be configured to correlate a view direction of a visitor to a dynamic security constraint 402, where view direction may be detected from image analysis, for example, by eye tracking. This will be discussed in further detail below. In still further examples, image/sound recognition/classification 308, 310 and risk determiner 426, 428 may be configured to determine a proximity of a visitor to a position of sensitive information. Proximity may be defined as proximity between locations (e.g., the visitor at one location and the sensitive information at another location), or proximity within the same location provided that position information of the visitor and the sensitive information within a location is available.

Security risks 408 may express one or both of the degree of risk (e.g., high, low, etc.) and the nature of the risk as determined from the respective data source 410-414, 308, 310. For example, a calendaring system 410 may characterize risks 408 as meetings, demonstrations, lectures, seminars, appointments, or other types of calendar events. A project management system 412 may characterize a risk 408 as a manufacturing step, material receiving or storage, or the presence of a secret prototype. Image recognition/classification 308 based on captured imagery 304 may characterize a risk 408 as display of confidential information.

The risk determiners 420-428 may include processor-executable instructions that may be pointed to input data from the respective source 410-414, 308, 310 to generate dynamic security constraints 402. A risk determiner 420-428 may incorporate a trained machine-learning model, such as a neural network, and/or a deterministic algorithm or mapping.

Figure 5:
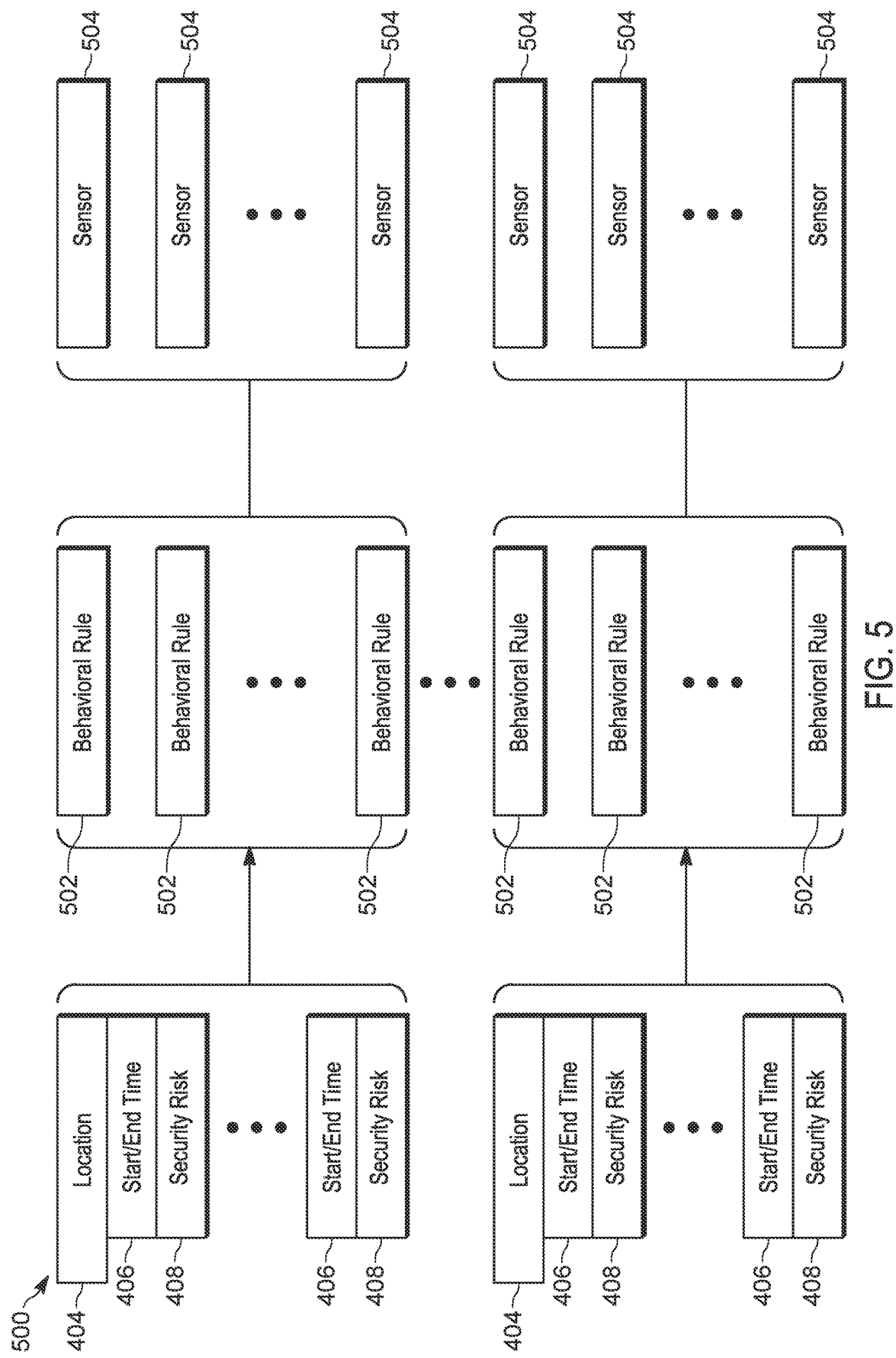
FIG. 5 is a schematic diagram of behavioral rules for a sensor system, according to embodiments of the present disclosure.

FIG. 5 shows process and data related to behavioral rules 500 at a building 110, as discussed above with regard to FIGS. 1 and 2 and specifically, behavioral rules 130 of FIG. 1 and blocks 206, 210 of FIG. 2. The behavioral rules 500 control operation of a sensor system to capture and interpret data concerning visitors present at locations in the building 110.

For each location 404 identified in a risk assessment 400 (FIG. 4), a set of security risks 408 with start/end times 406 are used to modify behavioral rules 502 for sensors 504 relevant to that location 404.

Updating of behavioral rules 502 may accord with the general principle that sensor activity, fidelity, and/or data analysis is increased for a security risk 408 posed by a visitor attending an incident at the building. For example, a sensor 504 that is normally off, may be turned on in response to a security risk 408. In another example, a sensor 504 that normally captures the presence or absence of a physical phenomenon (e.g., motion) may be configured to track a duration of sensed phenomenon. In other examples, analysis applied to sensor data may be activated or increased, such as using a camera to perform facial or feature recognition when normally the camera is merely used to record video. In still other examples, a sensor that uses a relatively low sample rate or resolution may have its sample rate or resolution increased. Temporarily applying the behavioral rules 502 during an incident reduces the consumption of processing resources, as compared to applying such behavioral rules 502 at all times.

Increasing sensor activity, fidelity, and/or data analysis may be achieved by capturing data that might otherwise be ignored or discarded. For example, a sensor 504 may normally sense a rich set of data, but during normal operation of the building, all or some of such data may be discarded. An updated behavioral rule 502 may cause such data to be captured and analyzed.

Reverting an updated behavioral rule 502 to a normal behavioral rule may be performed by ceasing the increased activity, fidelity, and/or data analysis.

Figure 6:
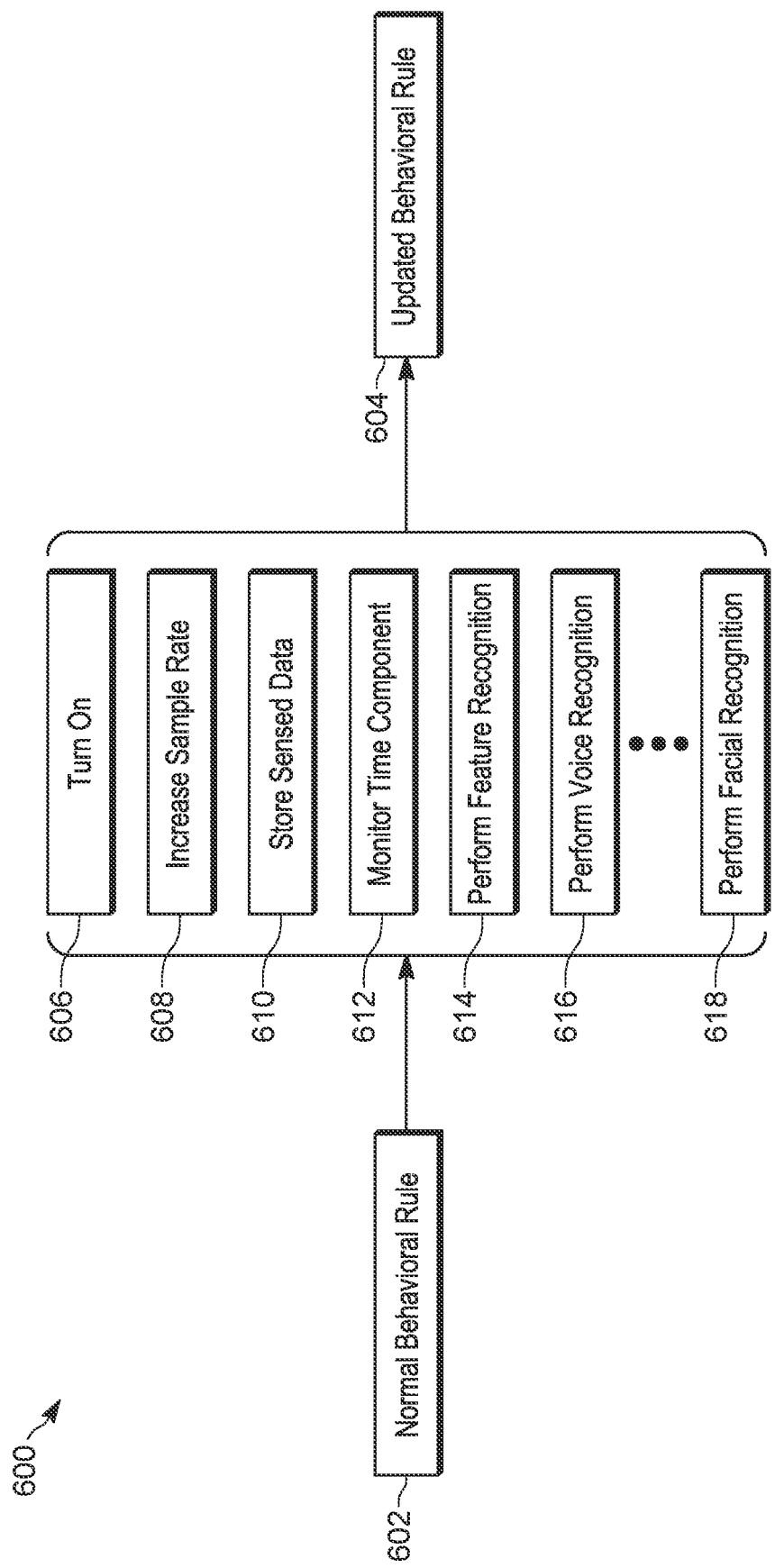
FIG. 6 is a schematic diagram of updating a behavioral rule, according to embodiments of the present disclosure.

FIG. 6 shows various example functions 600 to update a normal behavioral rule 602 to obtain an updated behavioral rule 604 for a sensor. Any one or more of the functions 600 may apply to a particular sensor. The functions 600 may include turning on 606 the sensor, increasing the sample rate or resolution 608 of data captured by the sensor, capture sensed data 610 that may otherwise be discarded or ignored, monitoring a time component 612 of sensed data (e.g., duration of motion detection), performing feature recognition 614 with sensed data (e.g., imagery or sound), performing voice recognition 616 with sensed sound, and performing facial recognition 618 with sensed imagery. Various other changes activity, fidelity, and/or data analysis for a sensor should be apparent to a person of ordinary skill in light of this disclosure.

Figure 7:
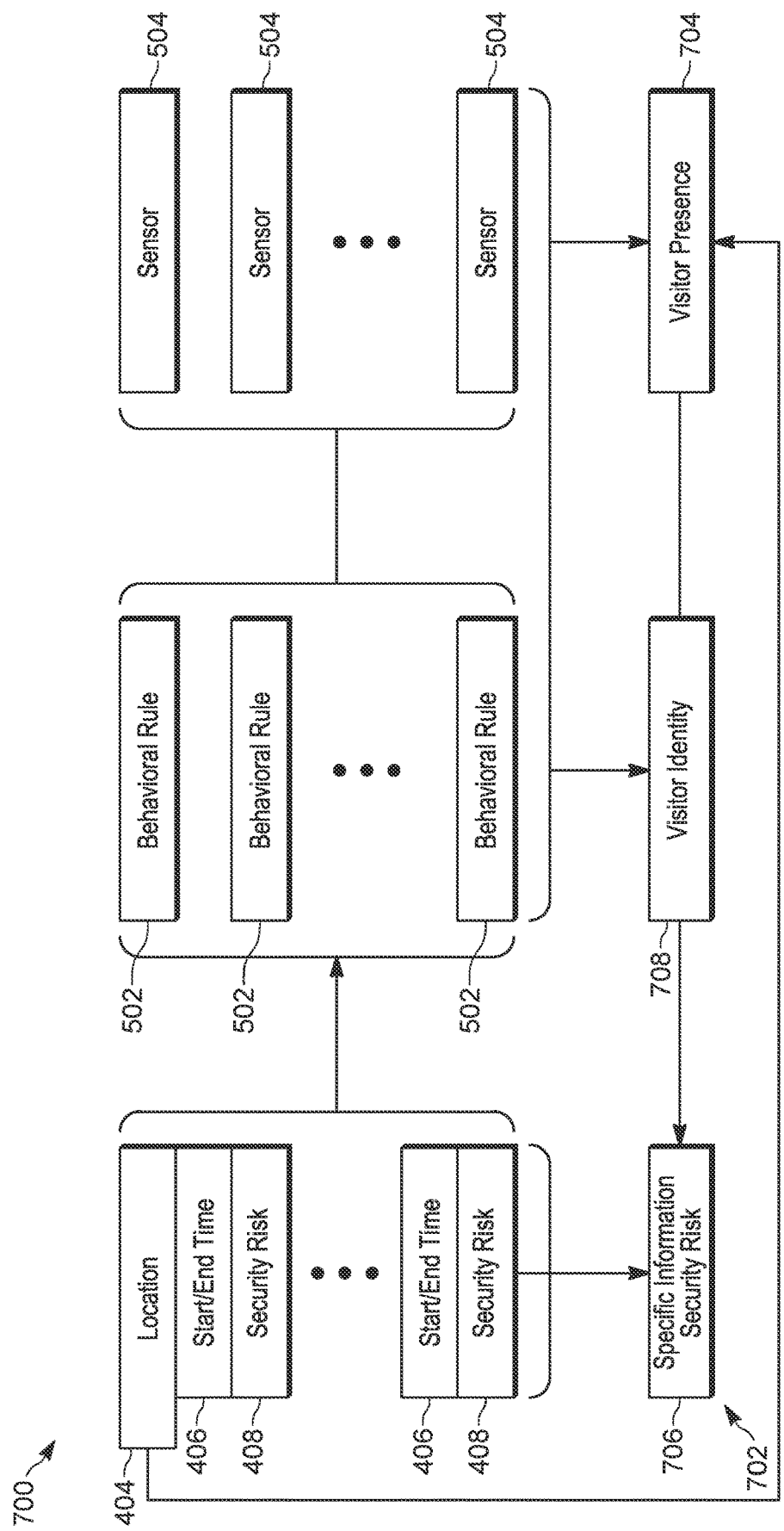
FIG. 7 is a schematic diagram of visitor detection and determination of a specific information security risk, according to embodiments of the present disclosure.

FIG. 7 shows process and data related to visitor detection 700 and determination of a specific information security risk 702 at a building 110, as discussed above with regard to FIGS. 1 and 2 and specifically, the specific risk 134 of FIG. 1 and blocks 212, 214 of FIG. 2.

Sensors 504 of a sensor system operating under updated set of behavioral rules 502 detect the presence 704 of a visitor at a location 404 monitored by the sensors 504.

The location 404 of the visitor is correlated to security risks 408 of the risk assessment to determine a specific information security risk 706 posed by the visitor. Security risks 408 may identify a degree of security and/or nature of sensitive information. Hence, a specific information security risk 706 may also indicate the degree of security and/or the nature of sensitive information via the correlation with location 404.

The specific information security risk 706 may be augmented by a visitor's identity 708, whether an individual identity or group identity. The visitor's identity 708 may be determined via behavioral rules 502 that control the sensors 504 and/or provide analysis of sensed data. The visitor may be identified by biometric, such as facial recognition or voice recognition, or other captured data, such as badge number, equipment, insignia, or uniform. The visitor may be classified as a first responder based on detection of badge, equipment, insignia, uniform, or similar indicator.

The specific information security risk 706 may thus specify degree of security, nature of sensitive information, and individual or group identity of a visitor that possibly witnessed the sensitive information.

Figure 8:
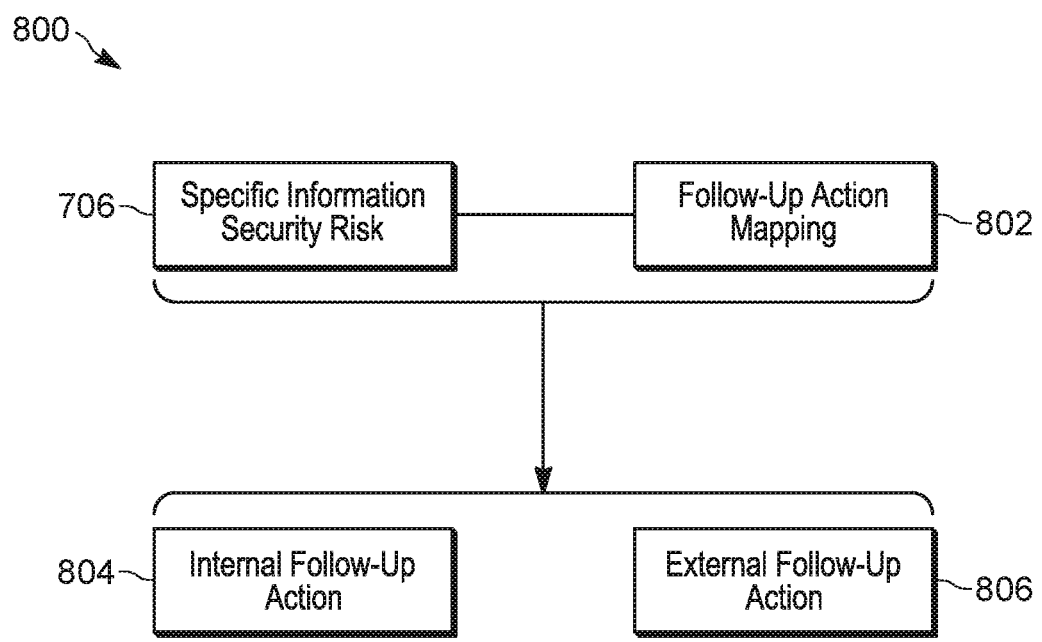
FIG. 8 is a schematic diagram of follow-up generation, according to embodiments of the present disclosure.

FIG. 8 shows process and data related to follow-up action generation 800 concerning an incident at a building 110, as discussed above with regard to FIGS. 1 and 2 and specifically, block 216 of FIG. 2.

A follow-up action mapping 802 may map specific information security risks 706 to follow-up actions 804, 806. Various combinations of degree of security, nature of sensitive information, and/or visitor identity as defined by specific information security risks 706 may have a specific follow-up action 804, 806, such as an NDA, interview, medical care recommendation (e.g., treatment in case of contact with a pathogen), request for media captured by the visitor, recommendation to the organization to which the visitor belongs, recommendation to the organization that controls the building (e.g., accelerate product launch due to a prototype being witnessed by a visitor). In another example, the sensitive information includes information that may affect a stock price or other financial information, and the follow-up action 804, 806 may include complying with insider trading regulations. An internal follow-up action 804 may include an electronic message transmitted to a person or group responsible for the building. An external follow-up action 804 may include an electronic message transmitted to the visitor or group to which the visitor belongs. In the case of emergency incidents, an external follow-up action 804 may be sent to the specific first responder organization to which the visiting first responder belongs.

Figure 9:
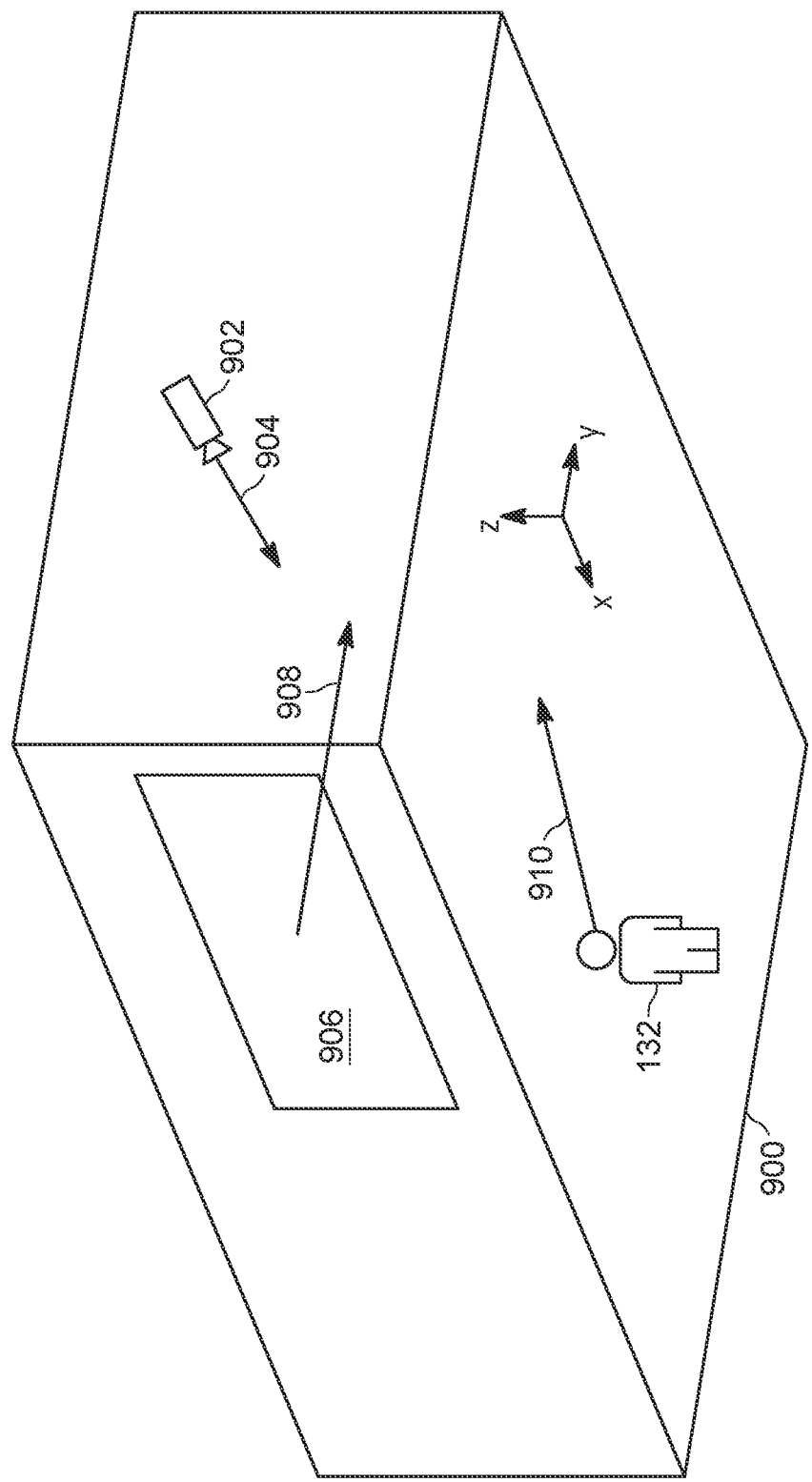
FIG. 9 is a perspective diagram of a view direction of a visitor correlated to sensitive information, according to embodiments of the present disclosure.

FIG. 9 shows view direction analysis to determine a specific information security risk.

A location 900 may be served by a camera 902, which may capture images/video of the location. The camera 902 may have a view direction vector 904 that is known. The location 900 may also include a medium 906 which may display sensitive information, such as a whiteboard or display device, which may have a characterizing vector 908, such as a normal vector, that characterizes visibility of information at the medium 906. A security risk 408 of information displayed at the medium 906 may be determined using the techniques discussed with regard to FIG. 4.

The camera 902 may be used to determine a specific information security risk 706 for the medium 906 when a visitor 132 is present based on techniques discussed with regard to FIG. 7. The specific information security risk 706 may further be determined with regard to a view vector 910 of a visitor 132.

Feature recognition of images captured by the camera 902 may be used to determine the general shape or outline of the medium 906 and infer the characterizing vector 908 of the medium 906. For example, a rectangular medium 906 may be detected as four feature lines, which may be transformed to have right angles therebetween. Solving for the transformation may determine a characterizing vector 908 that is perpendicular to the medium 906.

Feature recognition of images captured by the camera 902 may be used to determine the view vector 910 of the visitor 132. Gaze direction detection may be used.

The camera's known view direction vector 904 may be referenced to resolve angles between the view vector 910 of the visitor 132 and the characterizing vector 908 of the medium 906. If these angles are within respective thresholds of each other, so as to suggest that the content of the medium 906 is visible to the visitor 132, then a specific information security risk 706 may be determined to exist. An example threshold is the view direction vector 904 and the characterizing vector 908 being within 90 to 180 degrees of each other in an x-y plane parallel to the floor of the location 900, that is, within 90 to 180 degrees about a z-axis.

Figure 10:
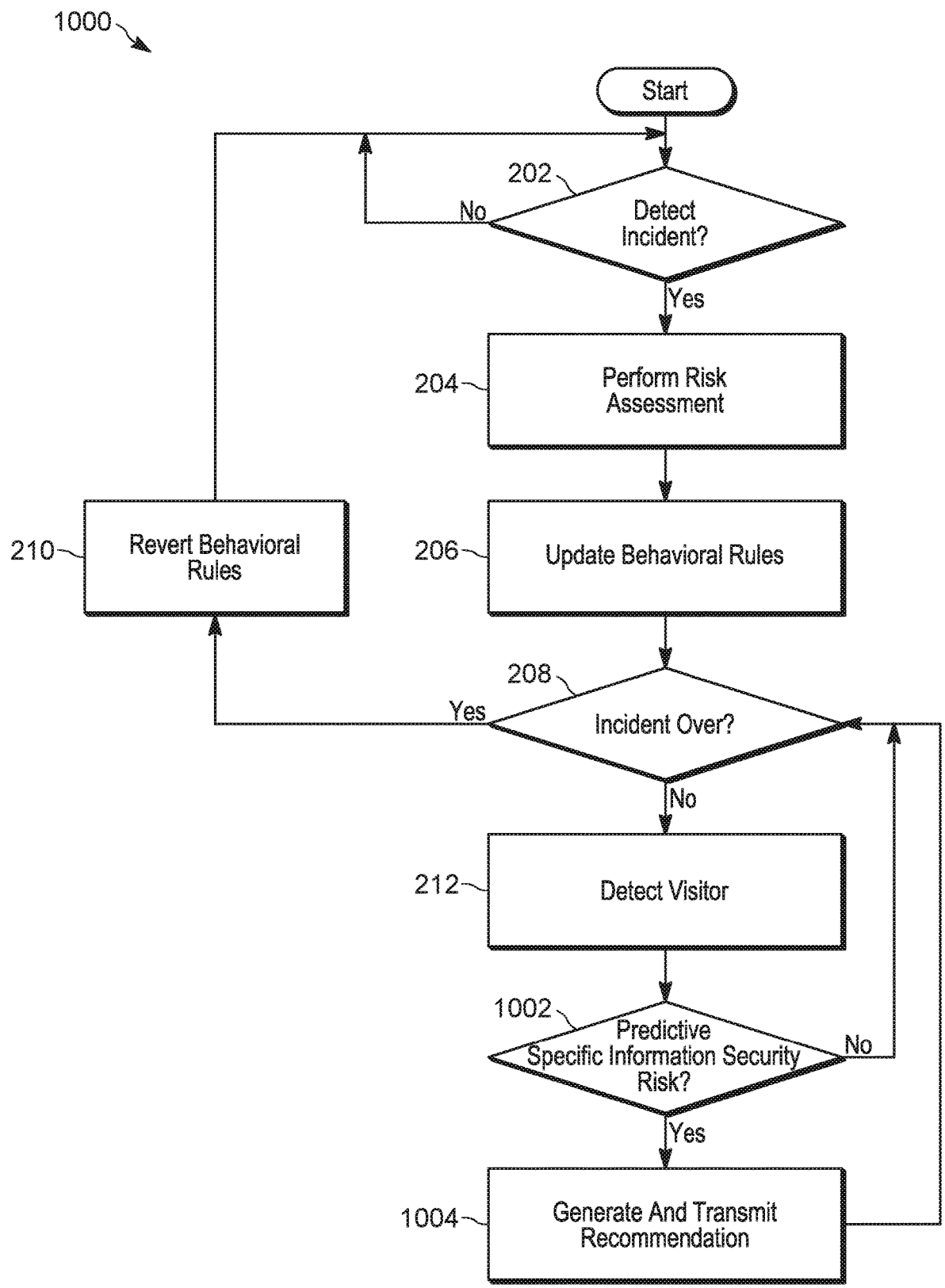
FIG. 10 is a flowchart of a method of recommending to a visitor a reduction or elimination of a specific information security risk, according to embodiments of the present disclosure.

FIG. 10 shows a method 1000 of recommending to a visitor a reduction or elimination of a specific information security risk. The method 1000 incorporates techniques discussed above with respect to the system 100 of FIG. 1 and the method 200 of FIG. 2. The method 1000 may be implemented with the system 100, such as by processor-executable instructions 126. Although the method 1000 is not limited to a particular system, FIG. 1 and related description may be referenced for further discussion that is not repeated here for sake of brevity, with like terminology and reference numerals denoting like components. The method 200 may be referenced for details not repeated here, particularly for blocks 202-212.

At block 1002, a predictive specific information security risk is determined based on the visitor's location, determined at block 212. A predictive specific information security risk is a specific information security risk determined as discussed elsewhere herein using locations adjacent the visitor's current location. For example, if the visitor is detected to be at a building entrance foyer, which connects to a meeting room and a hallway, then block 1002 determines specific information security risks associated with the meeting room and the hallway on the assumption that the visitor will soon enter one of those locations.

A building map or graph may be generated and referenced to determine interconnections among locations. For each next possible location that the visitor may enter, a specific information security risk may be determined.

If any specific information security risk is determined at block 1002, then a recommendation is generated and transmitted to a computing device operated by the visitor, at block 1004. The recommendation may assist the visitor in avoiding the specific information security risk to the extent practical. An example recommendation simply warns the visitor that sensitive information exists at the location. The visitor may then take that into account if entering the location. Another example recommendation alerts the visitor to the nature of the sensitive information exists at a location, so that the visitor may then guard against witnessing the sensitive information. Another example recommendation asks the visitor to turn off any recording devices that the visitor may be carrying. In still another example of a recommendation, the visitor is recommended move to one of several next locations, where the recommended location has the least (or no) specific information security risk. The visitor may thus be routed so as to avoid or reduce specific information security risks.

In this latter example, it may be useful to reference the location of the incident. The location of the incident may be known based on a sensor system, as discussed above. Should a particular location with sensitive information be positioned on an incorrect path towards the incident location, then block 1004 may recommend against the visitor entering the particular location. For example, with reference to FIG. 1, if the incident is detected as occurring at location 114E by a smoke alarm at that location and the visitor is detected at location 114B, then the visitor may be recommended to avoid locations 114C, 114D if these locations are determined to have predictive specific information security risks. This may reduce the chance that the visitor triggers an actual specific information security risk by unnecessarily entering a location 114C, 114D.

As the visitor may be a first responder, block 1004 should be configured as consistent with that job function, so as to avoid distracting the visitor or recommending a suboptimal route to the visitor.

As for communicating the recommendation to the visitor, the visitor's portable computing device may be preregistered with the system 100 of FIG. 1, so that the portable computing device automatically connects to the system 100 when present at the building 110. Additionally or alternatively, recommendations may be communicated through a messaging server controlled by the visitor's organization, so that the visitor's organization controls dissemination of recommendations to the visitor.

The method 1000 may be combined with the method 200 of FIG. 2. The method 1000 may be performed in parallel with the method 200.

In view of the above, it should be apparent that follow-up actions may be generated for visitors attending to locations of a building, so as to reduce or minimize the side-effects of visitors witness sensitive information present at the building. This may be particularly useful if the visitor requires access to otherwise secure areas, such as a first responder requiring access to a building undergoing an emergency incident. In addition, the visitor may be provided with a recommendation in real-time during the visit to reduce exposure to sensitive information. As such, unexpected incidents may be dealt with effectively, while preserving the security of sensitive information to the extent possible.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot generate and transmit follow-up actions based on specific information security risks, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable medium comprising instructions that, when executed by a processor, cause the processor to:

in response to detecting an incident at a building, perform a risk assessment for the building, wherein the risk assessment identifies dynamic security constraints for different locations at the building, wherein the dynamic security constraints indicate potential inadvertent disclosure of sensitive information that is visibly or audibly exposed to human perception when a visitor arrives at the building;

update a set of behavioral rules for controlling a sensor system at the building based on the risk assessment to obtain an updated set of behavioral rules;

reference the sensor system operating under the updated set of behavioral rules to detect the visitor at a location of the building during the incident;

correlate the location of the visitor to the risk assessment to determine a specific information security risk posed by the visitor witnessing the sensitive information; and generate a recommended follow-up action based on the specific information security risk to reduce the specific information security risk posed by the visitor witnessing the sensitive information.

2. The non-transitory computer-readable medium of claim 1, wherein the instructions further cause the processor to:

detect the incident as an emergency incident;

classify the visitor as a first responder responding to the emergency incident; and generate the recommended follow-up action specific to a first responder organization to which the first responder belongs.

3. The non-transitory computer-readable medium of claim 1, wherein the instructions further cause the processor to:

reference the sensor system to determine a group or individual identity of the visitor; and determine the specific information security risk posed by the visitor further based on the group or individual identity.

4. The non-transitory computer-readable medium of claim 1, wherein the instructions further cause the processor to:

in response to detecting an end of the incident at the building, revert the updated set of behavioral rules for controlling the sensor system to a previous set of behavioral rules.

5. The non-transitory computer-readable medium of claim 1, wherein the risk assessment identifies dynamic security constraints including one or more of:

a meeting at a particular location at the building;

a presence of an object at a particular location at the building;

a presence of a person at a particular location at the building;

information displayed at a particular location at the building; and sound at a particular location at the building.

6. The non-transitory computer-readable medium of claim 1, wherein the instructions further cause the processor to:

transmit a message including the recommended follow-up action to a computing device operated by an organization in control of the building.

7. The non-transitory computer-readable medium of claim 1, wherein the instructions further cause the processor to:

transmit a message to a computing device operated by the visitor, wherein the message includes a recommendation to the visitor to reduce or eliminate the specific information security risk.

8. The non-transitory computer-readable medium of claim 1, wherein:

the sensor system includes a camera; and the instructions are further to correlate a view direction of the visitor to the risk assessment to determine the specific information security risk posed by the visitor.

9. A system comprising:

a sensor system located at a building;

storage to store a risk assessment of the building and a set of behavioral rules for controlling the sensor system; and a processor connected to the sensor system and the storage, wherein the processor is configured to:

in response to detecting an incident at the building, perform the risk assessment for the building, wherein the risk assessment identifies dynamic security constraints for different locations at the building, wherein the dynamic security constraints indicate potential inadvertent disclosure of sensitive information that is visibly or audibly exposed to human perception when a visitor arrives at the building;

update the set of behavioral rules for the sensor system based on the risk assessment to obtain an updated set of behavioral rules;

reference the sensor system operating under the updated set of behavioral rules to detect the visitor at a location of the building during the incident;

correlate the location of the visitor to the risk assessment to determine a specific information security risk posed by the visitor witnessing the sensitive information; and generate a recommended follow-up action based on the specific information security risk to reduce the specific information security risk posed by the visitor witnessing the sensitive information.

10. The system of claim 9, wherein the processor is further configured to:
- detect the incident as an emergency incident;
- classify the visitor as a first responder responding to the emergency incident; and
- generate the recommended follow-up action specific to a first responder organization to which the first responder belongs.

11. The system of claim 9, wherein the processor is further configured to:
- reference the sensor system to determine a group or individual identity of the visitor; and
- determine the specific information security risk posed by the visitor further based on the group or individual identity.

12. The system of claim 9, wherein the processor is further configured to:
- in response to detecting an end of the incident at the building, revert the updated set of behavioral rules for controlling the sensor system to a previous set of behavioral rules.

13. The system of claim 9, wherein the risk assessment identifies dynamic security constraints including one or more of:
- a meeting at a particular location at the building;
- a presence of an object at a particular location at the building;
- a presence of a person at a particular location at the building;
- information displayed at a particular location at the building; and
- sound at a particular location at the building.

14. The system of claim 9, further comprising a network interface connected to the processor, wherein the processor is further configured to:
- transmit a message via the network interface to a computing device operated by an organization in control of the building, wherein the message includes the recommended follow-up action.

15. The system of claim 9, further comprising a network interface connected to the processor, wherein the processor is further configured to:
- transmit a message via the network interface to a computing device operated by the visitor, wherein the message includes a recommendation to the visitor to reduce or eliminate the specific information security risk.

16. The system of claim 9, wherein:
- the sensor system includes a camera; and
- the processor is further configured to correlate a view direction of the visitor to the risk assessment to determine the specific information security risk posed by the visitor.

17. A method comprising:
- in response to detecting an incident at a building, performing a risk assessment for the building, wherein the risk assessment identifies dynamic security constraints for different locations at the building, wherein the dynamic security constraints indicate potential inadvertent disclosure of sensitive information that is visibly or audibly exposed to human perception when a visitor arrives at the building;
- updating a set of behavioral rules for controlling a sensor system at the building based on the risk assessment to obtain an updated set of behavioral rules;
- referencing the sensor system operating under the updated set of behavioral rules to detect the visitor at a location of the building during the incident;
- correlating the location of the visitor to the risk assessment to determine a specific information security risk posed by the visitor witnessing the sensitive information; and
- generating a recommended follow-up action based on the specific information security risk to reduce the specific information security risk posed by the visitor witnessing the sensitive information.

18. The method of claim 17, further comprising:
- detecting the incident as an emergency incident;
- classifying the visitor as a first responder responding to the emergency incident; and
- generating the recommended follow-up action specific to a first responder organization to which the first responder belongs.

19. The method of claim 17, further comprising:
- in response to detecting an end of the incident at the building, reverting the updated set of behavioral rules for controlling the sensor system to a previous set of behavioral rules.

20. The method of claim 17, further comprising:
- transmitting a message to a computing device operated by an organization in control of the building, wherein the message includes the recommended follow-up action.

* * * * *